Fig.1

Patented Nov. 1, 1932

1,886,162

UNITED STATES PATENT OFFICE

NIELS C. CHRISTENSEN OF SALT LAKE CITY, UTAH

PROCESS OF TREATING SULPHIDE ORES OF ZINC

Application filed November 2, 1925. Serial No. 66,400.

This process relates to the treatment of sulphide ores of zinc. It is applicable to the treatment of ores which contain zinc sulphide alone or mixed with other sulphides such as galena, pyrite and chalcopyrite, etc. It is especially applicable to the treatment of the so-called complex or mixed sulphide ores of zinc and lead which as a rule contain silver and other sulphides such as pyrite or chalcopyrite (and in some cases other sulphides of copper, nickel or cobalt) mixed with the galena and sphalerite.

It is the object of the process to recover the zinc, and silver and also the other metals, from the ores as precipitates containing the metals or in metallic form.

The process relates particularly to the treatment of zinc sulphide ores with chloride solutions which are adapted to the recovery of the zinc from such ores as well as the recovery of the silver and lead (and in some cases the copper and other metals mentioned).

As described in my United States Patents 1,539,711, 1,539,714 and 1,539,712, the simple sulphide minerals of lead, silver and copper may readily be brought into solution in a concentrated chloride brine containing a relatively small percentage of acid in excess of the amount theoretically necessary to act on the soluble minerals in the ore. The lead may be brought into solution in the cold acid brine, but the action is much more rapid in the hot acid brine, whereas the copper and silver can only be brought into solution within a reasonable time in a hot acid brine. As noted in my United States Patents 1,539,713 and 1,572,268, the lead may be dissolved out of a mixed lead-zinc sulphide ore with an acid brine, either hot or cold (preferably hot), leaving the greater part of the zinc sulphide unattacked. Even when a large excess of acid is used in a hot sodium chloride brine, this chloride solution will not bring the greater part of the zinc from such ores into solution, unless a relatively very large ratio of solution to zinc sulphide in the ore is used.

These processes, therefore, leave the greater part of the zinc in the residual ore in its original condition, extracting the lead and leaving the greater part of the silver with the zinc sulphide, due to reprecipitation by the zinc sulphide. The fact that in the case of ores containing much zinc sulphide the silver remains largely with the residual zinc sulphide is a serious handicap to these processes. The fact that only a relatively small part of the zinc is dissolved is also a handicap as the zinc must be recovered in two separate products, one from the solution and the other from the treated ore.

These defects are overcome by the process described in my United States Patent 1,549,063 which consists in treating the ore with a relatively large excess of hot concentrated hydrochloric acid. By this process practically all the zinc and silver as well as the lead (also the copper in chalcocite and the metals in other simple sulphides) are dissolved. This process has the disadvantage of requiring a large excess of acid which must be distilled away from the treated ore in order to recover the metals from the treated ore and which must be condensed for reuse. This presents some rather difficult problems in the apparatus required.

It is the object of my process to overcome the disadvantages of all the processes described above and to recover the zinc and silver as well as the lead (and copper, etc.) with a chloride solution with the use of a relatively small excess of acid (compared with the process described in United States Patent 1,549,063). I have found that it is possible to dissolve practically all the zinc and silver in zinc sulphide ores without the use of a large excess of acid by the use of a suitable chloride brine together with the acid. As noted above a sodium chloride brine is not entirely satisfactory for this purpose. I have found however that if a relatively concentrated hot calcium chloride brine is used in the treatment of these ores, that practically all the zinc is brought into solution very rapidly by adding to this brine a relatively small excess of hydrochloric acid over and above the amount theoretically necessary to dissolve the soluble material in the ore. A few minutes agitation of finely ground sulphide ores of zinc, either simple or complex, with such a hot concentrated calcium chloride brine containing a small excess of acid, gives a practically complete extraction of the zinc and silver and lead from the ore in solution as chlorides in the brine. The copper in chalcocite (and the metals of other simple sulphides mentioned) are also dissolved. Pyrite and chalcopyrite are substantially unattacked. The sulphur combined with the zinc sulphide and galena (and other sulphides which are attacked) is driven off as $H_2S$, which is used in the recovery of the dissolved metals from the brine.

The method of treatment by my process is in general as follows: The finely ground ore is agitated with a sufficient volume of the hot calcium chloride brine to carry the lead and zinc chlorides formed in the treatment of the ore, and enough hydrochloric acid is added to the brine to react with the acid consuming material in the ore and leave an excess of acid in the solution. A relatively concentrated brine must be used to secure the best results, as the activity of the acid brine decreases with dilution. A brine composed of 50 parts of $CaCl_2$ to 100 parts of water gives excellent results but brines somewhat more dilute or more concentrated may be used with good results. The finer the ore is ground and the hotter the solution the more rapid and complete is the reaction. With ore ground through 200 mesh and the solution near the boiling point only a few minutes is required to dissolve practically all the zinc, silver and lead (and the copper and in some cases cobalt and nickel from their simple sulphides). The reactions are indicated as follows:

The pregnant solution is then separated from the residual ore (usually pyrite and quartz). This is preferably done by filtration, though in some cases decantation may be used. The exact procedure used in the separation of the pregnant solution from the ore will depend upon the nature of the ore, whether it is a simple zinc ore or one which contains considerable quantities of silver and lead. If the ore contains only zinc, the residual acid may be neutralized by the addition of finely ground oxidized zinc ore to the hot acid pulp. If the ore contains silver, there is danger of precipitating some silver out of the solution if the residual free acid is completely neutralized. With such ores the treatment with the acid brine is preferably continued until all the $H_2S$ is driven out of the pulp and a small amount of acid is preferably retained in solution to prevent precipitation of silver in the pulp by any neutralizing agent. Any neutralizing agent should therefore preferably not be used in sufficient amount to neutralize all the acid unless all the $H_2S$ has been removed from the solution. If the ore contains lead in any considerable amount, it is also preferable to maintain a small amount of acid in solution during filtration to insure complete extraction of the lead. If the acid is completely neutralized and there is any $H_2S$ in the pulp some silver will be precipitated and some lead may also be precipitated. Any neutralization of acid previous to filtration should therefore preferably not take place until the solution of the sulphides is complete and the $H_2S$ has been driven out of the pulp. It should be noted that the neutralization of the residual acid in this process is not open to the objection which arises in the treatment of complex ores with brine solutions for the recovery of lead and silver in which neutralizing the residual acid in the presence of the zinc sulphide in the treated ore causes the precipitation of the silver as a sulphide by the undissolved zinc sulphide. In this process the zinc sulphide is decomposed and the zinc dissolved and if the $H_2S$ is driven out of the solution there is practically no danger of any precipitation of silver (or lead) from solution. The filtration of the hot acid pulp is preferably carried out with acid proof filters supplied with acid proof filter media such as porous tubes of fused alumina (trade name alundum), or silica or porcelain, etc., or asbestos cloths. If the ore is such that the acid may be completely neutralized without loss of metals in the residual ore material ordinary filter media may be used. If the ore contains considerable lead so that the solution carries a high concentration of $PbCl_2$, the solution must be kept hot during filtration in order to avoid precipitation of the lead chloride.

The pregnant solution may also be separated from the residual ore by decantation and the washing of the residual ore may be carried out by counter current decantation. In case the separation of the solution from the ore is carried out in this way the same precautions as to neutralizing the residual acid as mentioned above must be considered. The same precaution as to maintenance of temperature, in the case of ores carrying much lead, in order to prevent precipitation of $PbCl_2$ during decantation must also be observed. In some cases it is advantageous to treat the ore with the hot acid concentrated brine and after the treatment is complete to dilute the pulp with water (either fresh water or preferably with wash water) and thereafter separate the solution from the residual ore by decantation and wash by counter current decantation. This method is especially suitable to ores relatively low in lead where there is no danger of loss due to precipitation of $PbCl_2$ by dilution and cooling. If desired the diluted solution may be separated from the ore by filtration instead of decantation.

The recovery of the zinc (and also other metals) from chloride solutions by methods other than electrolytic has been one of the difficulties which has militated against the treatment of zinc ores by various chloridizing and leaching processes. My preferred method is however very simple, direct and efficient. By it the zinc is recovered in a very pure precipitate and all the other metals may also be recovered in clean separate precipitates, by the use of cheap reagents used in connection with the $H_2S$ generated in the process.

My preferred process of recovering the metals from the pregnant brine consists in a process of selective precipitation by which the metals are recovered as separate sulphide precipitates. I have found that by passing $H_2S$ into the pregnant chloride solution in the presence of finely divided calcium carbonate, that the metals are selectively precipitated as sulphides in the following order: copper, lead, zinc, iron and manganese. By adding successive proper amounts of finely divided calcium carbonate and passing $H_2S$ into the solution, the copper, lead, zinc, iron and manganese may thus be precipitated as separate, clean precipitates. The amount of $CaCO_3$ used for each successive precipitation is determined by analyzing the solution so as to determine the quantity of free acid and metals in solution. The copper may be precipitated with $H_2S$ alone if the solution is not too strongly acid but if the solution is hot and strongly acid the excess acid must be neutralized with $CaCO_3$ in order to precipitate all of the copper with $H_2S$. The acid concentration which will permit precipitation of the copper will depend on the concentration of the $CaCl_2$ in solution and the temperature of the solution, the higher the concentration in $CaCl_2$ and the hotter the solution the lower the acid concentration which will prevent precipitation of the copper sulphide. This also applies to NaCl brines later referred to in regard to this method of precipitation. The Pb may be precipitated from hot concentrated brines with $H_2S$ only if the solution is nearly neutral, but if the brine is cold and dilute the lead may be precipitated from slightly acid brines, the acid concentration which will prevent the precipitation of PbS decreasing with increase in brine concentration and rise in temperature. The difference in the acid concentrations which will prevent the precipitation of the copper and lead from the brines as sulphides is so large that there is no difficulty in securing a selective precipitation of the copper followed by precipitation of the lead.

The acid concentrations which prevent the precipitation of the Zn, Fe and Mn from brines as sulphides are so low that there is no difficulty in precipitating all the lead from approximately neutral brines with $H_2S$ without precipitating any ZnS, FeS or MnS, since the acid formed by the precipitation of the PbS from a neutral brine (as indicated in the equation $PbCl_2+H_2S=PbS+2HCl$) is sufficient to prevent precipitation of any ZnS, FeS or MnS, unless the solution contains only a very small amount of Pb.

The differences in the very small acid concentrations which prevent precipitation of the ZnS, FeS and MnS are, however, sufficient to give a clean differential precipitation of the Zn, Fe and Mn by the use of the proper amount sof $CaCO_3$. To precipitate the Zn from solution without precipitating any Fe or Mn it is merely necessary to add slightly less $CaCO_3$ to the solution than the amount chemically equivalent to the Zn in solution, as indicated in the equation $ZnCl_2+H_2S+CaCO_3 = ZnS + CaCl_2 + CO_2 + H_2O$, and thereafter pass $H_2S$ through the mixture until the precipitation of the Zn is complete. After the precipitation of the Zn, the precipitation of the iron may be similarly carried out without precipitating any manganese by adding to the solution an amount of $CaCO_3$ chemically equivalent to the iron in solution, as indicated by the equation $FeCl_2+H_2S+CaCO_3=FeS+CaCl_2+H_2O+CO_2$ and passing $H_2S$ into the mixture until the iron is all precipitated.

If very pure products are desired the solution should first be saturated with $H_2S$ and the chemical equivalents of $CaCO_3$ should then be added continuously, or in small batches, together with more $H_2S$ so as to maintain a very slight acid concentration during the precipitation and thus prevent the precipitation of any of the metal to be precipitated in the next precipitation step, this very small acid concentration being maintained by keeping the precipitation, as indicated in the equation $ZnCl_2+H_2S=ZnS+2HCl$, slightly in advance of the neutralization, as indicated in the equation $2HCl+CaCO_3=CaCl_2+H_2O+CO_2$. High grade products may, however, be made by adding all the $CaCO_3$ at once if slightly less than the chemical equivalent of $CaCO_3$ as compared to the metal to be precipitated is used so that a very small amount of acid is present at the end of each selective precipitation, which prevents the precipitation of any of the metal to be precipitated in the next step. This precipitation is rather slow for all of the metals but the zinc and iron are precipitated considerably more rapidly than the manganese. The selective precipitation of the iron and zinc gives the best results in the cold but the final precipitation of the manganese may be made much more rapid by heating the solution, but in most cases it may be preferable to precipitate the manganese with $Ca(SH)_2$. Calcium hydroxide may be used for this selective precipitation instead of calcium carbonate but though the action is more rapid it is more difficult to obtain clean separate products and the operation is also more difficult as the $Ca(OH)_2$ tends to form small lumps or granules which are relatively inactive, and which must be ground up or emulsified with the solution during this precipitation in order to use up all of the $Ca(OH)_2$. Calcium sulphydrate may also be used for the selective precipitation of the metals from solution but the selective action is not nearly as perfect as the $CaCO_3-H_2S$ combination, or even as the $Ca(OH)_2-H_2S$ combination, though fairly good separate products may be obtained by careful addition of the $Ca(SH)_2$ in successive steps while the solution is well agitated. Calcium sulphydrate together with finely divided calcium carbonate or calcium hydroxide may also be used but has the same objections as $Ca(SH)_2$, i. e. the greater difficulty of making a clean separation. Various combinations of the foregoing methods may be used, for example, the lead may be recovered with $Ca(SH)_2$, or $H_2S$ alone for $H_2S$ and $CaCO_3$, the zinc may be recovered by using calcium carbonate and $H_2S$, the iron by using calcium carbonate and $H_2S$ (or $Ca(OH)_2$ and $H_2S$) and the manganese with $Ca(SH)_2$. An excess of $Ca(SH)_2$ makes the filtration very difficult and this should therefore be avoided. The precipitates made with $CaCO_3$ and $H_2S$ (and also $Ca(OH)_2$ and $H_2S$) filter very rapidly and without any difficulty.

In the treatment of ores high in lead my preferred method of precipitation is usually to dilute the pregnant solution with the wash water and then cool the diluted solution to precipitate as much of the lead as possible as $PbCl_2$. After separating the precipitated $PbCl_2$ from the diluted brine, the residual free acid is neutralized (with ore or $CaCO_3$) and the residual lead is precipitated with $H_2S$ or preferably with $Ca(SH)_2$. The lead may be precipitated from the dilute brine with $H_2S$ alone but with concentrated brine finely divided $CaCO_3$ must be used with the $H_2S$ to precipitate the lead as PbS. In the treatment of the diluted brine with $H_2S$, the lead is first precipitated as a tan colored sulphochloride which upon continued addition of $H_2S$ changes gradually through different shades of red to the deep red color of the normal sulphochloride and finally as the sulphochloride is decomposed by the $H_2S$ turns to the black lead sulphide. $Ca(SH)_2$ precipitates the lead completely from either concentrated or diluted brine. A very clean product may be precipitated if only a very slight excess of $Ca(SH)_2$ over the theoretical amount indicated in the following equation is used in the diluted (15% to 20% $CaCl_2$) brine: $2PbCl_2 + Ca(SH)_2 = 2PbS + CaCl_2 + 2HCl$. In a very concentrated brine (50g to 60g $CaCl_2$ to 100cc $H_2O$) double this amount must be used to secure complete precipitation. After precipitation of the lead, the zinc, iron, and manganese are preferably precipitated as described above by the use of calcium carbonate and $H_2S$, or if desired with $Ca(OH)_2$ and $H_2S$, or with $Ca(SH)_2$, or any desired combination of these.

In the case of ores which have a considerable amount of soluble iron and manganese it is sometimes advantageous to give the comminuted ore a preliminary wash (either hot or cold) with a dilute hydrochloric acid solution (water and HCl alone) to remove these and prevent contamination of the mill solution containing the zinc (or zinc, silver and lead). In this case if the pregnant solution is clean enough after the lead (or silver and lead) has been removed as described above the zinc may be precipitated as a clean product with $Ca(SH)_2$ (or with either $CaCO_3$ or $Ca(OH)_2$ and $H_2S$ if desired). The metals may be recovered from the preliminary wash solution of chlorides, usually carrying zinc, iron and manganese, by the selective methods of sulphide precipitation above described, the zinc, iron and manganese being secured as separate sulphide precipitates, by the use of finely divided calcium carbonate and $H_2S$ (or $Ca(OH)_2$ and $H_2S$) or may be precipitated with $Ca(SH)_2$ if desired. The resulting dilute $CaCl_2$ solution is then treated with sufficient $H_2SO_4$ to precipitate the calcium as calcium sulphate and the HCl solution thus regenerated is used for the treatment of more ore.

The $Ca(SH)_2$ which may be used for precipitation is made by passing $H_2S$ from the lixiviation of the ore into milk of lime in a suitable tower or spray chamber.

The foregoing methods of recovering the lead, zinc, iron and manganese from the calcium chloride brine or the diluted calcium chloride brine or from the chloride wash solution are applicable not only in this process but are particularly applicable to the recovery of these metals from all chloride brines and chloride wash solutions obtained in the treatment of raw sulphide ores with acid brines, such as those described in my Patents 1,539,711; 1,539,712; 1,539,714; and 1,539,713, which processes are directed primarily to the recovery of lead or lead and silver from sulphide ores. In all these processes some zinc is dissolved by the acid brines in the treatment of complex sulphide ores as well as considerable amounts of iron and manganese in many cases, and the foregoing methods of recovering these from the sodium chloride and mixed brines used in these processes constitute valuable methods of cleaning these solutions and securing valuable by-products therefrom.

The general method of precipitating the metals from the clear pregnant solution separated from the treated ore will vary with the metal content of the ore treated but is in general as follows: If the pregnant solution contains silver and also lead in considerable quantity, the silver is preferably precipitated from the hot solution by bringing the solution into contact with metallic lead which rapidly precipitates the silver from solution. (If the solution contains copper the silver may be precipitated with copper and the copper with lead). The greater part of the lead is then precipitated from solution as $PbCl_2$ by cooling or preferably by diluting and cooling the brine. This is best carried out by adding the wash water from the filtering and washing operation to the hot brine and passing a current of cold air through a spray of the diluted brine formed as described in my United States Patents #1,462,363 and #1,441,064. The cold solution still containing a small percentage of Pb, as well as the zinc and other metals dissolved out of the ore, may then be treated for the recovery of these as follows: The residual acid in the solution is preferably neutralized by treatment with finely ground sulphide ore (which is later treated as described above) or with finely ground oxidized zinc ore or with calcium carbonate if desired. $H_2S$ made from the acid brine treatment of sulphide ore is then passed through the solution precipitating out all the lead as PbS. (First as the sulphochloride which is changed to the sulphide by further treatment with $H_2S$.) This is preferably carried out by passing the $H_2S$ through a spray of the solution as mentioned above. If the brine is not sufficiently diluted it may be necessary to add some finely divided oxidized zinc ore (zinc oxide or carbonate) or limestone to the solution during the passage of the $H_2S$ in order to neutralize the acid formed and secure complete precipitation of the lead. The reactions are indicated below:

$$PbCl_2 + H_2S = PbS + 2HCl$$
$$2HCl + CaCO_3 = CaCl_2 + H_2CO_3$$

By this means all the lead may be precipitated from relatively concentrated brines by means of $H_2S$. The lead may also be completely removed from the brine by agitating with zinc sulphide previously precipitated from the brine used in the process, as indicated in the following chemical equation,—

$$PbCl_2 + ZnS = PbS + ZnCl_2$$

and as described in my United States Patent No. 1,572,268 (precipitated FeS or MnS may be used instead of the ZnS). After filtering out the PbS the lead free solution may be treated for the recovery of the zinc preferably by adding finely divided calcium carbonate to the solution and passing $H_2S$ through the mixture. By this means the zinc is precipitated as a sulphide as indicated below, the $CaCO_3$ neutralizing the acid formed by the action of the $H_2S$ on the $ZnCl_2$ in solution.

$$ZnCl_2 + CaCO_3 + H_2S = ZnS + CaCl_2 + H_2CO_3$$

If the proper proportion of $CaCO_3$ to $ZnCl_2$ in solution is used practically all the zinc may be precipitated as a clean white zinc sulphide even though the solution contains a considerable amount of iron and manganese. Any small amount of $CaCO_3$ left with the ZnS may readily be dissolved away by treatment with very dilute HCl, or preferably with acetic acid, giving a pure white ZnS which should be as valuable as ZnO for making paints and enamels or for use in the manufacture of linoleum, rubber goods, etc., as it is extremely fine and has many of the qualities of ZnO in a very high degree. If desired, calcium hydroxide may be used instead of $CaCO_3$ but is more difficult to use because of its tendency to agglomerate during the treatment thus requiring grinding or emulsifying in order to use up all the lime and prevent contamination of the precipitated ZnS with an excessive amount of $Ca(OH)_2$ and CaS. The separation with $Ca(OH)_2$ is also not as clean cut as when $CaCO_3$ is used.

After filtering out the precipitated ZnS the solution may be treated with more finely divided $CaCO_3$ and $H_2S$ to precipitate the iron out of the solution. If the right proportion of $CaCO_3$ to iron in solution (i. e. a chemical equivalent or slightly less), is used practically all the iron may be precipitated as a black sulphide containing practically no manganese, even though the solution contains a considerable amount of manganese. If desired $Ca(OH)_2$ may be used instead of $CaCO_3$ but has the objectionable features mentioned above and does not give as clean a separation between the different metals as $CaCO_3$.

After filtering out the precipitated iron sulphide, the solution may be treated with more calcium carbonate and $H_2S$ as described to precipitate out the manganese, which is precipitated as a clean flesh colored precipitate of MnS. If desired $Ca(OH)_2$ may be used instead of $CaCO_3$ but the $CaCO_3$ remains in a dispersed condition and does not require grinding to break up the granules such as are formed when $Ca(OH)_2$ is used. In all these cases however the precipitation with $CaCO_3$ and $H_2S$ requires a somewhat longer time than the precipitation with $Ca(OH)_2$ and $H_2S$, but this is more than compensated for by the avoidance of the necessity for grinding to break up the granules formed when $Ca(OH)_2$ is used and the cleaner separation of the metals.

A remarkable feature of this differential precipitation of PbS, ZnS, FeS and MnS with $H_2S$ in the presence of $CaCO_3$ (or $Ca(OH)_2$) is that all of these precipitates filter rapidly without any difficulty—giving a clear filtrate.

If it is desired to produce very high grade clean products of two sulphides ZnS and FeS, and FeS and MnS may be made at the end of the Zn and Fe precipitations in order to separate the clean products. These may be discarded or used in the next clean precipitations, the FeS in the ZnS—FeS mixture being used to precipitate ZnS and the MnS in the FeS—MnS mixture being used to precipitate FeS.

It is obvious that the zinc and iron and manganese need not be selectively precipitated as described but may be precipitated together or in different combinates or groups if desired by using $H_2S$ and $CaCO_3$ (or $Ca(OH)_2$) or by using $Ca(SH)_2$. The silver may also be precipitated as a sulphide by means of $H_2S$ or $H_2S$ and $CaCO_3$ (or $Ca(OH)_2$) in the same manner as described for the lead or the silver may be precipitated by means of PbS or Zn (or FeS or MnS) if desired instead of using lead as described. It will be apparent that the method used will depend upon the character of the ore and the amount of the various metals taken into solution during the treatment. It is therefore apparent that all the different possible variations in the above method of precipitating the metal and cleaning the solutions cannot be described in detail in the scope of a patent specification.

The precipitated FeS and MnS obtained in cleaning the mill solution are easily and completely roasted to $Fe_2O_3$ and $Mn_2O_3$ giving a very finely divided brilliant red iron oxide and a very finely divided rich brown manganous oxide, both of which are valuable as pigments.

If it is desired to recover the sulphur as $H_2S$ from the FeS and MnS precipitates they may be heated in an atmosphere of superheated steam giving the lower oxides of iron and manganese (which quickly oxidize to the higher oxides in the presence of air) as shown by the following equations:

$$FeS + H_2O = FeO + H_2S$$
$$MnS + H_2O = MnO + H_2S$$

In all these methods of precipitating the metals as sulphides by the use of $H_2S$ and calcium carbonate or calcium hydroxide or with calcium sulphydrate, the chlorine which was combined with the precipitated metals in the solution remains in the solution as calcium chloride after the precipitation. The HCl used in the dissolving of the zinc and other metals may therefore be easily and cheaply recovered by treating a portion of the calcium chloride solution with sulphuric acid, so as to decompose the $CaCl_2$ and secure HCl and $CaSO_4$. This may be done in solution and the $CaSO_4$ be filtered out if only a relatively small amount of HCl is used in the treatment of the ore, but is preferably carried out by treating a portion of the concentrated $CaCl_2$ brine in an iron pot with concentrated $H_2SO_4$ and heating slightly to drive off all the HCl. The water and HCl thus driven out of a 50% $CaCl_2$ solution may be condensed together to give a HCl solution carrying from 20% to 30% HCl depending on the concentration of the $H_2SO_4$ used. In this way the expense of manufacturing the HCl from NaCl and $H_2SO_4$ is avoided and the acid is recovered from the mill solution.

Other methods of cleaning the solutions and recovering the zinc therefrom may be used. For example after the removal of the lead as described in the foregoing, the iron may be precipitated as ferric hydroxide by adding finely divided $CaCO_3$ to the solution and thoroughly agitating and aerating the mixture, preferably by means of the spray device described in my United States Patent #1,462,363. If desired $Ca(OH)_2$ may be used instead of $CaCO_3$. To hasten the oxidation and precipitation of the iron chlorine may be passed into the solution or bleaching powder may be used if desired. After filtering out the precipitated ferric hydroxide, the manganese may be precipitated as a hydrated oxide by passing chlorine through the solution, or by adding bleaching powder or other strong oxidizing agents. In the cold this precipitation of the manganese requires a long period, and is rarely completed except by heating for a considerable time. After the removal of the manganese the solution may be electrolyzed in a diaphragm cell to recover the zinc and the chlorine combined with the latter. The electrolysis of the clean zinc chloride brine presents no difficulties if the iron and other impurities are removed.

Instead of electrolyzing the clean zinc chloride brine the zinc may, if desired, be precipitated therefrom as ZnS by the addition of $Ca(SH)_2$ made from the $H_2S$ generated in the treatment of the ore or by the use of $H_2S$ in the presence of $CaCO_3$ or $Ca(OH)_2$ as previously described.

The chlorine from the electrolysis of the $ZnCl_2$ solution may be used to make HCl for use in the process by mixing it with the $H_2S$ generated in the treatment of the ore in a suitable reaction tower or spray chamber. HCl and sulphur would thus be secured according to the following reaction:

$$H_2S + Cl_2 = 2HCl + S$$

The electrolysis of the clean zinc chloride brine in a diaphragm cell requires a relatively very high voltage (5 to 6 volts) and the cell is complicated by the necessity of trapping and removing the chlorine. Satisfactory diaphragms are also difficult to obtain. The zinc should also not be removed below 2% or 3% in the solution for satisfactory electrolysis and should preferably be maintained near 10% to 15% for best results. These conditions are difficult to maintain in a mill solution.

In order to overcome these difficulties I prefer to secure the metallic zinc from the zinc sulphide by electrolysis. Two methods may be used. The first method consists in electrolyzing the zinc chloride in a hot brine solution (either $CaCl_2$ or $NaCl$) with a permeable lead anode through which the solution is passed at such a rate that the lead chloride formed at the anode is dissolved in the brine and carried out of the cell before it can diffuse to the cathode. Solution carrying zinc chloride is added to the cell near the cathode and passed through the permeable lead anode and out of the cell carrying with it, in solution, the $PbCl_2$ formed at the anode. To this hot solution precipitated zinc sulphide (obtained from the mill solution as described above) is added in sufficient quantity to precipitate the lead and regenerate the zinc chloride in solution as shown by the following chemical equation:

$$PbCl_2 + ZnS = PbS + ZnCl_2$$

The PbS is settled or filtered out of the solution which is then returned to the cell and passed through the same cycle again. In this way the use of a diaphragm is avoided, a practically constant zinc content may be maintained in the electrolytic cell, and a very low voltage is required due to the electromotive force generated at the anode by the formation of the $PbCl_2$ and also due to the operation of the cell at a high temperature. As no free chlorine is generated the cell may be open and of relatively simple construction. The voltage required is very low ranging from .75 to 1.25 volts according to the current density used. The PbS formed by the reaction between the ZnS and the $PbCl_2$ as described, may be smelted by ordinary smelting methods for the recovery of the lead which may then be used again in the anode of the cell. In this way the greater part of the energy usually required in electrolyzing zinc solutions is supplied by the cheaper energy of the fuel used in the smelting operation (of the PbS). If desired the PbS may be dissolved in a slightly acid brine and recovered as a chloride and smelted with carbon and lime as described in my United States Patent 1,539,711.

The lead used in the anode is preferably granulated so as to allow a free and uniform flow of the electrolyte through the anode.

If it is desired the metallic zinc may be recovered from the zinc sulphide, made in the process as described, by dissolving the ZnS in a sulphuric acid solution and electrolyzing the zinc sulphate solution thus formed and neutralizing the sulphuric acid generated in the electrolysis by the addition of the precipitated ZnS made in the process so as to prevent depletion of the zinc solution. In this way the zinc in solution may be maintained at a practically constant concentration and the solution may be kept practically neutral, both of which are very advantageous in the electrolysis of zinc sulphate solutions. The solution should preferably be circulated through the cells at a comparatively rapid rate and the ZnS should preferably be added outside of the cells so that the $H_2S$ generated by the reaction between the ZnS and $H_2SO_4$ may be collected and recovered if desired and so that an ordinary open type of cell may be used. By this method the acid content of the solution may be kept very low allowing the use of a very high current density and high temperature without excessive resolution of the zinc cathode.

In the carrying out of my process various methods may be used for heating the solution and pulp but my preferred method consists in first heating the calcium chloride brine by passing it through a spray tunnel counter-current to the hot gases of combustion from an oil or gas or coal dust burner or coal furnace, as described in my United States Patent #1,441,064. By this method the solutions may be efficiently heated without dilution and without clogging up of the heating apparatus. The solution may also be concentrated to any desired amount during the heating operation by proper control of the amount of fuel burned.

The finely ground ore is then mixed with the hot brine and this pulp mixture is then preferably heated by passing the pulp through a tunnel counter-current to hot gases from an oil, gas or coal dust burner (or coal furnace) and agitating the pulp during this passage so that the pulp is brought into contact with the hot gases passing over it and brought practically to the boiling point.

The desired amount of HCl acid (preferably hot and concentrated) is then added to the hot pulp and the mixture is passed through an agitator where the reaction is completed and the $H_2S$ driven off. In the heating of the brine and the pulp the concentration of the brine is preferably carried to such a point that the water introduced with the HCl does not reduce the concentration of the brine below that which should be maintained for the best operating conditions.

If the pulp and acid have been heated to a sufficiently high temperature in the preliminary heating before reaching the agitator in which the treatment of the ore is completed, no further heating is necessary with many ores (if the ores have been ground sufficiently fine) as the reaction is rapid and complete if the agitation is thorough enough to break up the froth and free the $H_2S$. If needed or desired the pulp may be heated in the agitator by the introduction of superheated steam into the pulp, or by the passage of hot oil through pyrex glass or silica tubes submerged in the pulp, (Merrill system). The heating and agitation of the acid pulp should preferably be continued until the reaction is complete and the $H_2S$ is driven out of the pulp. If this is done a practically complete extraction of the zinc, silver, and lead may be secured from finely ground sulphide ores. The pyrite usually found in such ores remains substantially unattacked.

As previously mentioned, the hot pregnant solution is preferably separated from the pulp by filtration, though the treatment of the pulp beyond this point will depend largely upon the character of the ore treated as to the amount of lead and silver (and soluble impurities) contained in the ore with the zinc. In most cases in which complex ores are treated, sufficient lead will be present to require that the temperature of the pulp be maintained at a high point so as to prevent precipitation of lead chloride. In this case the hot pulp is preferably filtered away from the residue of treated ore, and the metals precipitated therefrom as previously outlined, the wash water from the filtering operation being preferably mixed with the pregnant solution after the precipitation of the silver and before the precipitation of the lead chloride.

If the ore contains a relatively small amount of lead (or the operation is conducted so that the solution carries only a relatively small amount of lead) the pregnant solution may be recovered from the residue of ore by decantation and the residual ore may be washed by a system of counter-current decantation, the wash solution being mixed with the pregnant brine before precipitation of the metals as previously described. In some cases the hot pulp from the agitation may be diluted before the decanting and washing operation. The neutralization of the acid and treatment by decantation and washing by counter-current decantation would have many advantages over filtration if the previous treatment has eliminated sulphides and $H_2S$ so as to avoid danger of loss by reprecipitation of silver and lead. Whether or not the residual acid left after treatment of the ore is neutralized will depend as previously mentioned upon the nature of the ore and the thoroughness with which the $H_2S$ is eliminated in the treatment. If the neutralization brings about the precipitation of any considerable amount of aluminum hydroxide and magnesium hydroxide a small amount of lead and silver will be carried down with these, but unless $H_2S$ is present this loss will not be serious unless the amount of precipitate is large. If the $H_2S$ is not eliminated however this loss may be serious and the treatment with the acid brine should therefore be continued until the reaction is complete. If this is done the residual acid may be neutralized with oxidized ore or limestone and the filtration of the pulp may be carried out with ordinary cotton filter media unless too high a concentration of $ZnCl_2$ is carried in the mill solution, when filter media of porous alumina, silica or porcelain or asbestos cloths must be used. If cotton or woolen cloths are used the neutralization must be carried to such a point that the aluminum is largely removed from solution, as $AlCl_3$ destroys these filter media in hot solution very rapidly. If the acid is neutralized as described the separation of the pregnant solution and washing of the residual ore may be carried out in ordinary decantation apparatus (i. e. non-acid proof). The large amount of evaporation secured in the heating and cooling operations makes possible the use of a large amount of wash solution and a large amount of dilution without building up of the mill solution. This is one of the advantages of the above described methods of carrying out my process. This feature together with the complete cleaning of the solutions by the method of precipitation with calcium carbonate (or $Ca(OH)_2$) and $H_2S$ described above, and the regeneration of the HCl from the solution by treatment of a portion of the concentrated barren solution with $H_2SO_4$ makes possible the carrying out of the process without loss of reagents or dissolved metals, as theoretically no solutions are discarded due to fouling or building up of wash solutions as in the case with many other processes. These features together with the practically complete recovery of all the valuable metals in the ore are advantages over present methods of treating complex zinc sulphide ores which will be apparent to all those familiar with the present day metallurgical treatment of these ores.

The residue of ore left from the treatment by my process is usually small in amount and consists in most cases of pyrite and silica. The gold contained in the ore is also left with the residue and in some cases a small amount of the silver is locked up in the pyrite so that it can not be dissolved. The severe acid treatment to which the pyrite (and other non-soluble sulphides) has been subjected makes it very amenable to flotation and a practically complete recovery of the gold and pyrite (and residue of silver) from the siliceous gangue may be had by treating this residue by flotation preferably in a slightly acid pulp with a very small amount of frothing agent.

Figure 1:
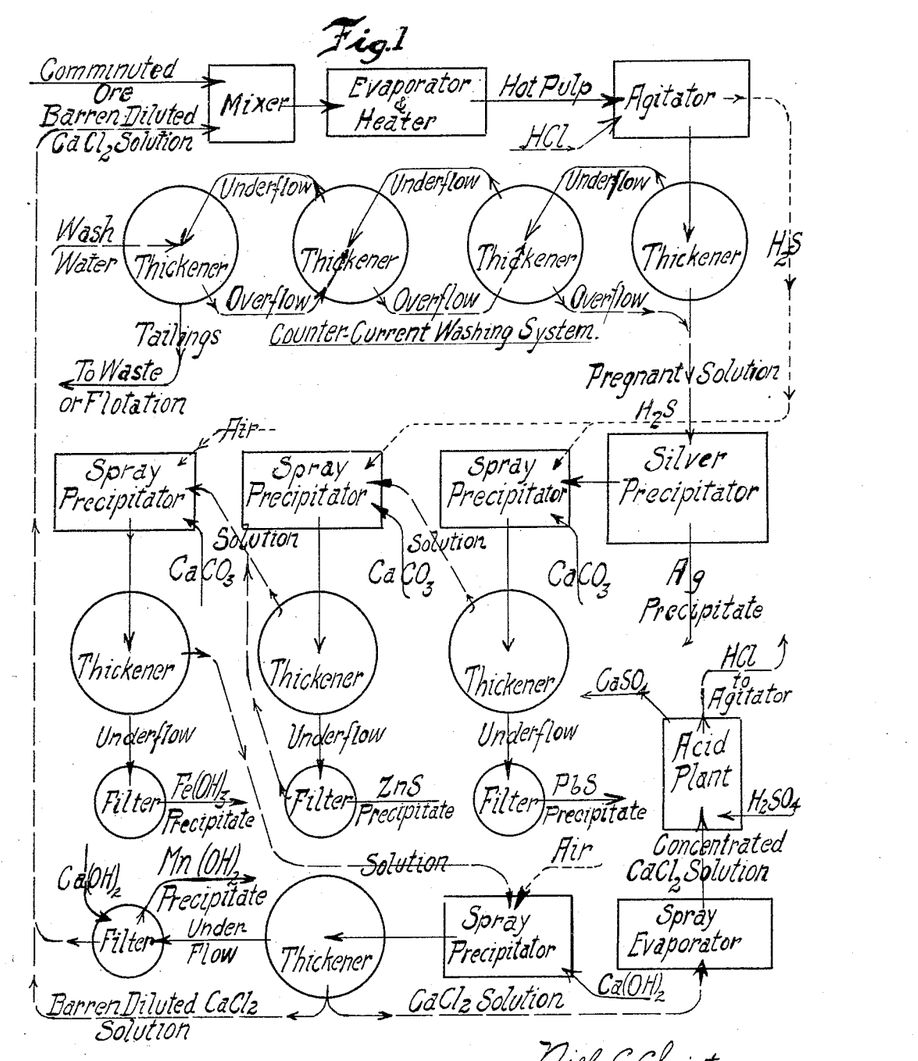
Figure 2:
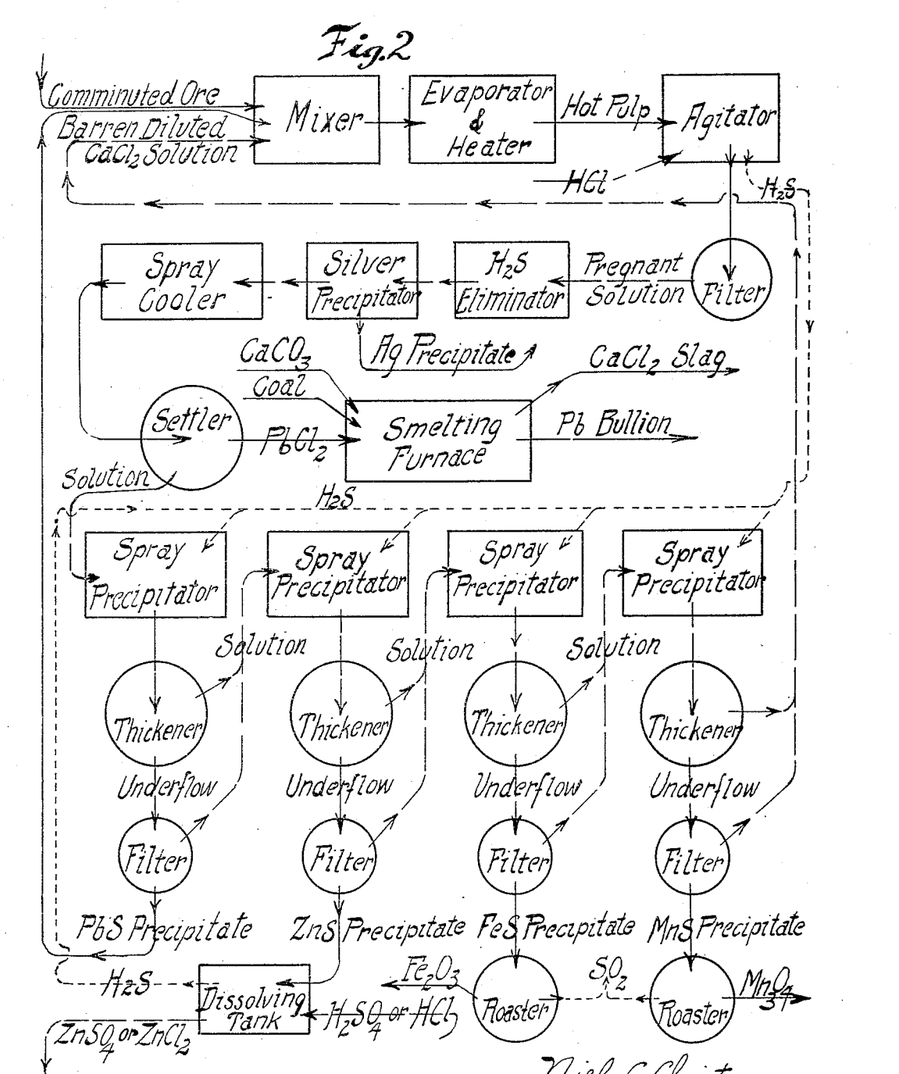
Figure 3:
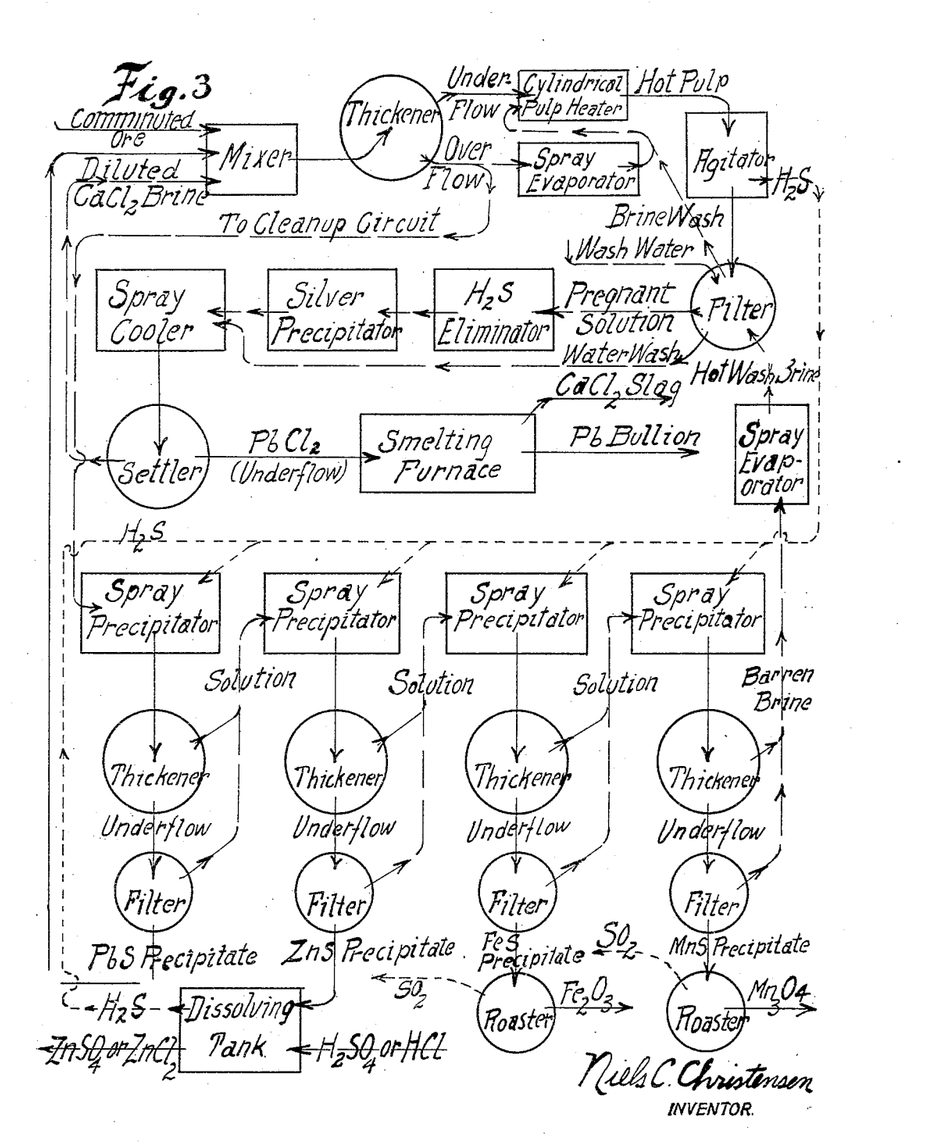

The three figures of the drawings appended hereto illustrate methods which may be used when treating ores of different kinds by my process. Flow sheet, Fig. 1, shows a method of carrying out the process upon high grade zinc ores carrying a relatively small amount of lead (or no lead). The incoming ore (usually wet filter cake from the fine grinding department) is mixed with the barren dilute mill solution in a suitable mixer or pug mill; the mixture then passes through the pulp heater in which the excess water is evaporated and the pulp is heated to the boiling point; the hot concentrated pulp together with the required amount of HCl passes into the agitator where the mixture is agitated until the dissolving operation is completed; from the leaching agitator the pulp flows through a counter-current system of thickeners in which the dissolved chlorides are washed out by counter-current decantation, the washed residue of ore going to flotation or to waste and the pregnant solution through the silver precipitator in which the Ag is precipitated upon metallic Pb; the silver-free pregnant solution then passes to the clean-up department, first through a spray precipitator in contact with $H_2S$ (from the leaching agitator) which precipitates the lead as PbS (if the solution is too concentrated at this point $CaCO_3$ may be added to complete the precipitation of the Pb); the precipitated PbS is separated out of the solution by means of a suitable filter, or thickener and filter or thickener alone, and the lead free solution passes through a second spray chamber in contact with $H_2S$ from the leaching operation and finely divided $CaCO_3$ in proper amount to precipitate the zinc from the solution as ZnS; the ZnS is then separated from the solution in a suitable thickener and filter arrangement and the zinc-free solution is mixed with more finely divided $CaCO_3$ and passed through a third spray chamber in contact with air, the iron being precipitated as ferric hydroxide; the ferric hydroxide is filtered out of the solution which is then mixed with finely divided $Ca(OH)_2$ and passed through a fourth spray chamber in contact with air, the manganese being precipitated as a mixture of manganese hydroxides: the manganese precipitated is filtered out of the barren solution which is returned to the head of the circuit and used over again in the treatment of more ore. A portion of the barren $CaCl_2$ solution is concentrated (by being passed through a spray evaporator) and this concentrated $CaCl_2$ solution is treated with $H_2SO_4$ in the acid plant to make HCl for use in the leaching of the ore in the agitator together with a small amount of $H_2SO_4$ to make up for acid loss.

Flow sheet, Fig. 2, illustrates a method of treating an ore containing both lead and zinc in considerable amount. This treatment differs from that shown in flow sheet, Fig. 1 in that the hot pregnant solution is separated from the leached ore by means of a filter and the hot pregnant solution is passed through a spray chamber in contact with hot air, to eliminate any $H_2S$ in the solution, before passing the solution through the silver precipitator and is then mixed with wash water from the filtering operation and passed through a spray cooler to precipitate lead chloride which is settled out of the solution and smelted with lime (or finely divided $CaCO_3$) and carbon (coal dust) in a reverberatory furnace giving lead bullion and $CaCl_2$ slag, the latter being dissolved in the barren mill solution or used in the acid plant to make HCl for the leaching operation. The cold low grade lead solution is passed into the clean-up or precipitation department in which the Pb, Zn, Fe and Mn are precipitated separately in successive spray chambers by means of $H_2S$ and finely divided $CaCO_3$, the precipitated PbS being returned to the head of the circuit, the precipitated ZnS being dissolved by treatment with HCl or $H_2SO_4$ to make $ZnCl_2$ or $ZnSO_4$ and the $H_2S$ from this operation being used in the precipitating department as indicated, the precipitated FeS and MnS are roasted to make high grade iron oxide and manganese oxide; the dilute $CaCl_2$ brine is returned to the head of the circuit and used in the treatment of more ore, a portion however being withdrawn to make HCl in the acid plant as described.

Flow sheet, Fig. 3, illustrates the treatment of a high grade lead ore containing zinc sulphide. It differs from the treatment shown in flow sheet, Fig. 2, principally in that only such a portion of the low grade solution passes through the clean-up circuit as is necessary to keep the zinc, iron and manganese within working limits in the solution. This is done by passing the mixture of ore and solution from the mixer into a thickener from which a thickened underflow passes to a pulp heater (rotary kiln type) and the clear solution overflow is separated into two portions, the main portion passing through a spray evaporator and back into the main mill circuit with the ore entering the pulp heater, and the other portion passing through the clean-up circuit where the Pb, Zn, Fe and Mn are precipitated with $H_2S$ and finely divided $CaCO_3$, the dilute barren solution from this treatment being concentrated and heated in a spray evaporator and used as a brine wash in the main filtering operation and returned to the circuit at the head of the pulp heater. The precipitated PbS is returned to the head of the circuit and redissolved, the ZnS is dissolved with $H_2SO_4$ (and this solution may be electrolyzed by recovery of the Zn as metal) and the $H_2S$ used in the precipitating department, the FeS and MnS are roasted to oxides as described. The diluted low grade mill solution from the $PbCl_2$ settler is returned to the head of the circuit and used over again as indicated. The $PbCl_2$ is smelted with $CaCO_3$ and carbon as described and the CaCl₂ is utilized in the leaching circuit or acid plant as previously described. In this circuit H₂SO₄ may be used instead of HCl in the leaching agitator if desired, the HCl being generated in the pulp and the CaSO₄ formed passing out with the leached residue.

It is obvious that many other combinations than those described in these flow sheets may be made to meet different conditions in the treatment of different ores and these flow sheets are therefore merely illustrative of the steps in the process and of the apparatus which may be used in the process and not the only steps or combinations which are possible.

From the foregoing it will be apparent that my process has a wide field of usefulness in the treatment of ores containing zinc sulphide and that the results obtained by it in the recovery of practically all the metals either as primary products or by-products are remarkable as compared with the present day relatively inefficient and wasteful treatment of these complex sulphide ores.

It will be apparent that it is impossible to fully describe the many variations and differences in method possible in the application of my process to various ores of different character, and I do not therefore desire to be limited entirely by the foregoing description except as the description is embodied in the accompanying claims.

Having described my process, what I claim and desire to patent is:

1. The process of treating sulphide ores of zinc containing lead and silver which consists in agitating said comminuted ore together with a hot concentrated calcium chloride solution containing hydrochloric acid and thereby dissolving the zinc and silver and lead out of said ore in said solution, separating the pregnant solution from said ore, and precipitating the silver from the hot solution with metallic lead and thereafter cooling said solution and precipitating lead therefrom as lead chloride, precipitating the residual lead from the cold solution as a sulphide, and thereafter adding a finely divided calcium carbonate to said solution and passing H₂S into said mixture and thereby precipitating the zinc out of said solution as a sulphide.

2. The process of treating zinc sulphide ores which consists in agitating said ore together with a hot concentrated calcium chloride solution containing hydrochloric acid and thereby dissolving the zinc out of said ore in said solution as a chloride, separating said pregnant solution from the residue of treated ore, precipitating the zinc and other metals therefrom with calcium carbonate together with H₂S derived from such said treatment of such said ore, so as to obtain the metals as sulphides and leave the chlorine in said solutions as calcium chloride, and treating a portion of the calcium chloride solution with sulphuric acid to make hydrochloric acid and using said acid with calcium chloride solution to treat more ore.

3. The process of treating sulphide ores of zinc which consists in agitating said comminuted ore together with a hot calcium chloride solution containing hydrochloric acid and thereby dissolving the zinc from said ore in said solution, separating said pregnant solution from the residue of treated ore, and selectively precipitating the zinc, iron and manganese from said solution as sulphides in the order named by adding successive amounts of finely divided calcium carbonate to said solution and passing H₂S into said solution.

4. The process of treating zinc-lead sulphide ores which consists in agitating the comminuted ore together with a hot concentrated calcium chloride solution, containing approximately 50 parts or more of CaCl₂ to 100 parts of water and containing an excess of hydrochloric acid and thereby dissolving substantially all of the zinc, lead and silver from said ore in said solution, separating the pregnant solution from the residue of treated ore, precipitating silver from said solution with metallic lead, diluting said solution and cooling said diluted solution and precipitating lead chloride therefrom, precipitating the residual lead from said solution as a sulphide with H₂S from such above said treatment of sulphide ore, precipitating zinc from said lead free solution as a sulphide with H₂S from such above said ore treatment, and finely divided calcium carbonate.

5. The process of treating zinc-lead sulphide ores containing iron which consists in agitating the comminuted ore together with a hot concentrated calcium chloride solution, containing approximately 50 parts or more of CaCl₂ to 100 parts of water and containing an excess of hydrochloric acid and thereby dissolving substantially all of the zinc, lead and silver from said ore in said solution, separating the pregnant solution from the residue of treated ore, precipitating silver from said solution with metallic lead, diluting said solution and cooling said diluted solution and precipitating lead chloride therefrom, precipitating the residual lead from said solution as a sulphide with H₂S from such above said treatment of sulphide ore, precipitating zinc from said lead free solution as a sulphide with H₂S from such above said ore treatment, and finely divided calcium carbonate, and thereafter precipitating dissolved iron from said solution as a sulphide with H₂S, from such above said ore treatment, and finely divided calcium carbonate.

6. The process of treating zinc-lead sulphide ores containing iron which consists in agitating the comminuted ore together with a hot concentrated calcium chloride solution, containing approximately 50 parts or more of $CaCl_2$ to 100 parts of water and containing an excess of hydrochloric acid and thereby dissolving substantially all of the zinc, lead and silver from said ore in said solution, separating the pregnant solution from the residue of treated ore, precipitating silver from said solution with metallic lead, diluting said solution and cooling said diluted solution and precipitating lead chloride therefrom, precipitating the residual lead from said solution as a sulphide with $H_2S$ from such above said treatment of sulphide ore, precipitating zinc from said lead free solution as a sulphide with $H_2S$, from such above said ore treatment, and finely divided calcium carbonate, and thereafter precipitating dissolved iron from said solution as a sulphide with $H_2S$, from such above said ore treatment, and finely divided calcium carbonate, precipitating dissolved manganese from said solution as a sulphide with $H_2S$, from such above said ore treatment, and finely divided calcium carbonate, and thereafter heating and concentrating said solution and using it in the treatment of more ore.

7. The process of treating zinc-lead sulphide ores which consists in agitating said comminuted ore together with a hot concentrated calcium chloride solution containing approximately 50 parts or more of $CaCl_2$ to 100 parts of water and containing an excess of hydrochloric acid and thereby dissolving substantially all of the zinc, lead and silver from said ore in said solution, separating the pregnant solution from the residue of treated ore, precipitating silver therefrom with metallic lead, diluting last said solution with wash water from the washing of said treated ore and precipitating the lead from said solution as a sulphide by means of $H_2S$ from such above said ore treatment and precipitating the zinc from said lead free solution as a sulphide by means of $H_2S$, from such above said ore treatment, and finely divided calcium carbonate.

8. The process of treating zinc-lead sulphide ores which consists in agitating the comminuted ore together with a hot concentrated calcium chloride solution containing approximately 50 parts or more of $CaCl_2$ to 100 parts of water and containing an excess of hydrochloric acid and thereby dissolving substantially all of the zinc and lead in said ore in said solution, separating the pregnant solution from said ore and diluting said solution and neutralizing the residual acid therein and precipitating the lead therefrom with $H_2S$ and thereafter precipitating the zinc therefrom as a sulphide by means of $H_2S$ and finely divided calcium carbonate.

9. The process of treating zinc-lead sulphide ores containing iron which consists in agitating the comminuted ore together with a hot concentrated calcium chloride solution containing approximately 50 parts or more of $CaCl_2$ to 100 parts of water and containing in excess of hydrochloric acid and thereby dissolving substantially all of the zinc and lead in said ore in said solution, separating the pregnant solution from said ore and diluting said solution and neutralizing the residual acid therein and precipitating the lead therefrom with $H_2S$ and thereafter precipitating the zinc therefrom as a sulphide by means of $H_2S$ and finely divided calcium carbonate, and thereafter precipitating iron from said solution as a sulphide by means of $H_2S$ and finely divided calcium carbonate.

10. The process of treating zinc-lead sulphide ores containing iron which consists in agitating the comminuted ore together with a hot concentrated calcium chloride solution containing approximately 50 parts or more of $CaCl_2$ to 100 parts of water and containing an excess of hydrochloric acid and thereby dissolving substantially all of the zinc and lead in said ore in said solution, separating the pregnant solution from said ore and diluting said solution and neutralizing the residual acid therein and precipitating the lead therefrom with $H_2S$ and thereafter precipitating the zinc therefrom as a sulphide by means of $H_2S$ and finely divided calcium carbonate, and thereafter precipitating iron from said solution as a sulphide by means of $H_2S$ and finely divided calcium carbonate, and thereafter precipitating manganese from said solution as a sulphide with $H_2S$ and finely divided calcium carbonate and concentrating and heating the residual solution and using it in the treatment of more ore.

11. The process of treating zinc-lead sulphide ores which consists in agitating the comminuted ore together with a hot concentrated calcium chloride solution containing approximately 50 parts or more of $CaCl_2$ to 100 parts of water and containing an excess of hydrochloric acid and thereby dissolving substantially all of the zinc, lead and silver from said ore in said solution, separating the pregnant solution from the residue of treated ore and precipitating lead therefrom by means of $H_2S$ and finely divided calcium carbonate and thereafter precipitating zinc therefrom by means of $H_2S$ and finely divided calcium carbonate.

12. In the treatment of zinc-lead sulphide ores with calcium chloride brines, the precipitation of the lead from the concentrated chloride solution as a sulphide by adding finely divided calcium carbonate to said solution and passing $H_2S$ into said mixture.

13. The selective precipitation of zinc, iron and manganese from chloride solutions by adding successive amounts of finely divided calcium carbonate to said solution and passing $H_2S$ into said mixture and thereby precipitating as sulphides the metals in said solution in the order named above.

14. The selective precipitation of lead, zinc, iron and manganese from chloride brines by adding successive amounts of finely divided calcium carbonate to said solution and passing $H_2S$ into said mixture and thereby precipitating as sulphides the metals in said solution in the order named above.

15. The selective precipitation of zinc from chloride solutions containing iron by adding finely divided calcium carbonate to said solution and passing $H_2S$ into said mixture and thereby precipitating zinc as a sulphide substantially free from iron.

16. The selective precipitation of zinc from chloride solutions containing manganese by adding finely divided calcium carbonate to said solution and passing $H_2S$ into said mixture and thereby precipitating zinc as a sulphide substantially free from manganese.

17. The selective precipitation of zinc from chloride solutions containing iron and manganese by adding finely divided calcium to said solution and passing $H_2S$ into said mixture and thereby precipitating zinc as a sulphide substantially free from iron and manganese.

In testimony whereof I have signed my name to this specification.

NIELS C. CHRISTENSEN.